US007133061B2

(12) United States Patent
Dewa et al.

(10) Patent No.: US 7,133,061 B2
(45) Date of Patent: Nov. 7, 2006

(54) MULTILASER BI-DIRECTIONAL PRINTER WITH AN OSCILLATING SCANNING MIRROR

(75) Inventors: Andrew Steven Dewa, Plano, TX (US); Arthur Monroe Turner, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 195 days.

(21) Appl. No.: 10/867,326

(22) Filed: Jun. 14, 2004

(65) Prior Publication Data

US 2005/0275710 A1 Dec. 15, 2005

(51) Int. Cl.
*B41J 27/00* (2006.01)
(52) U.S. Cl. ..................... 347/243; 347/259
(58) Field of Classification Search ........ 347/233–235, 347/241–243, 248, 256–261; 359/196–215, 359/225; 353/30; 250/205; 358/534; 386/127
See application file for complete search history.

(56) References Cited

U.S. PATENT DOCUMENTS

| 4,533,941 | A  | * | 8/1985  | Keane et al. ............... 358/534 |
| 4,689,482 | A  | * | 8/1987  | Horikawa et al. .......... 250/205 |
| 6,945,652 | B1 | * | 9/2005  | Sakata et al. ................ 353/30 |
| 2002/0164157 | A1 | * | 11/2002 | Hori et al. .................. 386/127 |

* cited by examiner

*Primary Examiner*—Hai Pham
(74) *Attorney, Agent, or Firm*—William B Kempler; W. James Brady; Frederick J. Telecky, Jr.

(57) ABSTRACT

System and method for generating lines of data on a photosensitive medium for use with a display or a printing apparatus. The lines of data are generated by two or more modulated and parallel laser light beams onto a resonant pivoting torsional hinged mirror. The pivoting mirror sweeps the two modulated light beams back and forth across the photosensitive medium to provide bi-directional printing. Relative motion between the photosensitive medium and the plane of the sweeping light beam is provided by moving the photosensitive medium when used with a printing apparatus or by also orthogonally moving the sweeping plane of the light beams when used with a display device.

24 Claims, 11 Drawing Sheets

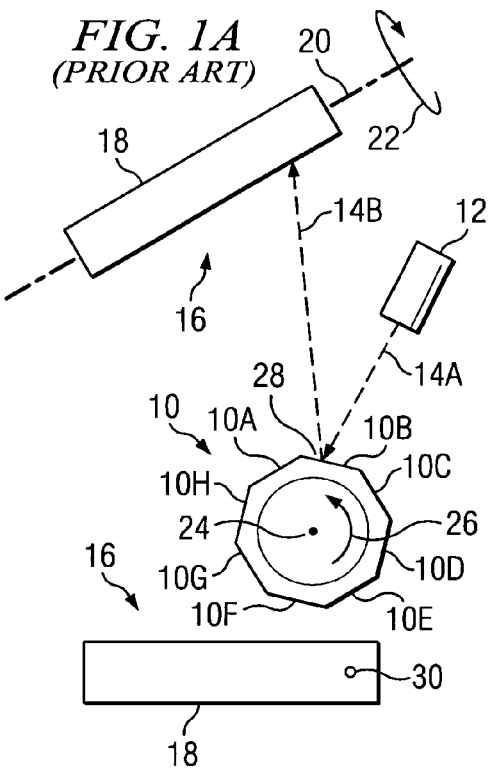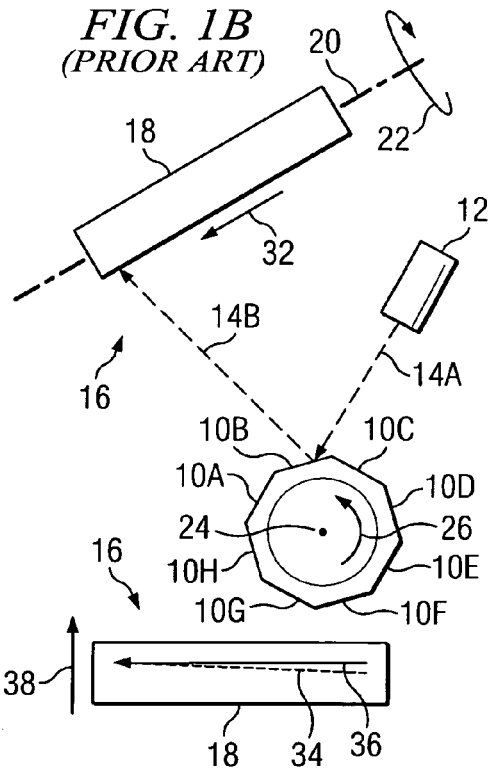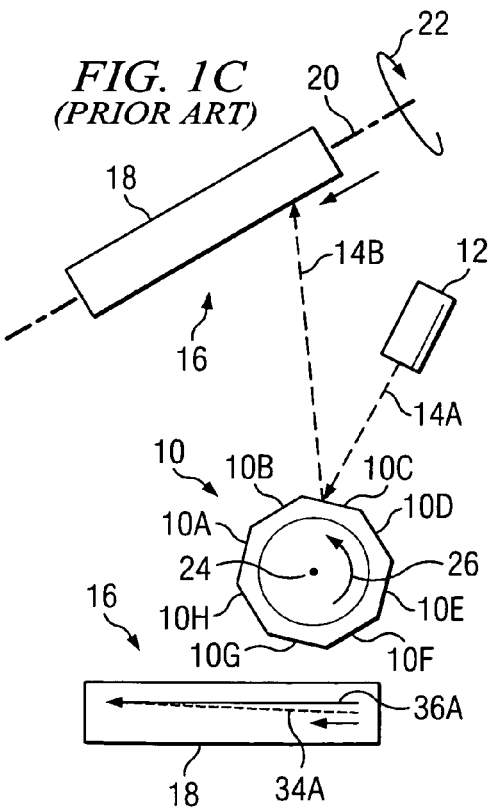

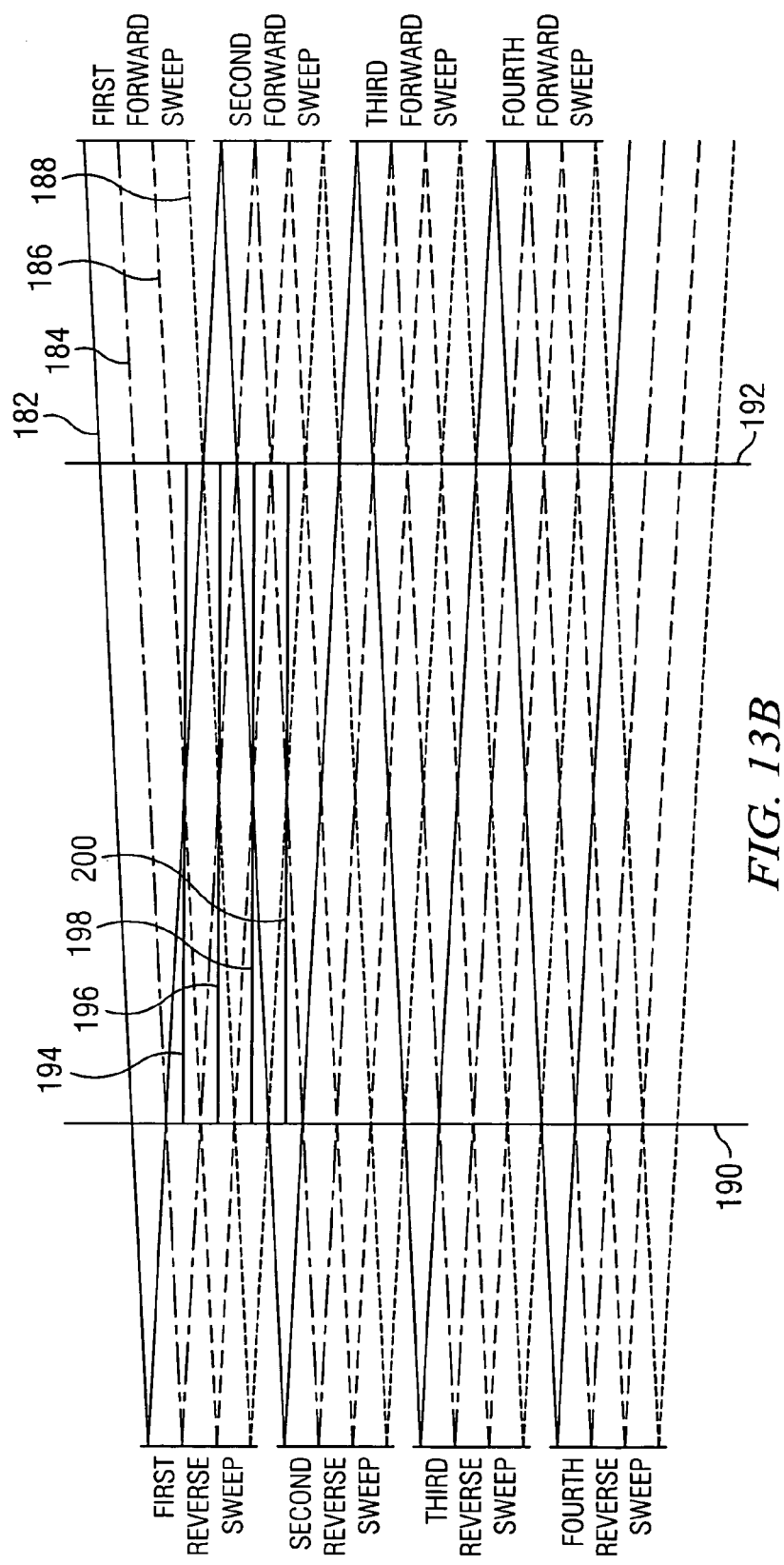

MULTILASER BI-DIRECTIONAL PRINTER WITH AN OSCILLATING SCANNING MIRROR

TECHNICAL FIELD

The present invention relates generally to pivoting MEMS (micro-electric mechanical systems) torsional hinge mirrors, including scanning mirrors operating at a resonance frequency, and more specifically to the use of such mirrors with multilaser beams and bi-directional printing.

BACKGROUND

Rotating polygon scanning mirrors are typically used in laser printers to provide a "raster" scan of the image of a laser light source across a moving photosensitive medium, such as a rotating drum. Such a system requires that the rotation of the photosensitive drum and the rotating polygon mirror be synchronized so that the beam of light (laser beam) sweeps or scans across the rotating drum in one direction as a facet of the polygon mirror rotates past the laser beam. The next facet of the rotating polygon mirror generates a similar scan or sweep, which also traverses the rotating photosensitive drum but provides an image line that is spaced or displaced from the previous image line. Since increasing the rotational speed of a polygon mirror is accompanied by even greater increases in cost, printer manufacturers using polygon mirrors as a drive engine often use two or four equally spaced and parallel lasers all directed toward and reflected from a single facet of the polygon mirror.

There have also been prior art efforts to use a less expensive flat mirror with a single reflective surface to provide a scanning beam. For example, a dual axis or single axis scanning mirror may be used to generate the beam sweep or scan instead of a rotating polygon mirror. The rotating photosensitive drum and the scanning mirror are synchronized as the drum rotates in a forward direction to produce a printed image line on the medium that is parallel with the beam scan or sweep generated by the pivoting mirror and orthogonal to the movement of the photosensitive medium.

However, with the single axis mirrors, the return sweep will traverse a trajectory on the moving photosensitive drum that is at an angle with the printed image line resulting from the previous or forward sweep. Consequently, use of a single axis resonant mirror, according to the prior art, required that the modulation of the reflected light beam be interrupted as the mirror made the return sweep or completed its cycle, and was then turned on again as the beam started scanning in the original direction. Using only one of the sweep directions of the mirror, of course, reduces the print speed. Therefore, to effectively use a scanning mirror to provide bi-directional printing, the prior art attempts of bi-directional scanning required that the sweep plane also be controlled in a direction perpendicular to the scan such that the sweep of the mirror in each direction generates images on a moving or rotating photosensitive drum that are always parallel. To achieve such parallel lines required continuous perpendicular adjustment of the sweeping beam, and such adjustment can be accomplished by the use of a dual axis torsional mirror or a pair of single axis torsional mirrors. It has been discovered, however, at very high print speeds both forward and reverse sweeps of a single axis mirror may be used, and that no orthogonal adjustment is necessary.

Texas Instruments presently manufactures torsional dual axis and single axis pivoting MEMS mirrors fabricated out of a single piece of material (such as silicon, for example) typically having a thickness of about 115–125 microns. The dual axis layout may, for example, consist of the mirror surface being supported on a gimbal frame by two silicon torsional hinges, whereas for a single axis device the mirror is supported directly by a pair of torsional hinges. The mirror may be of any desired shape, although an elliptical shape having a long axis of about 4.0 millimeters and a short axis of about 1.5 millimeters is particularly useful. Such an elongated ellipse-shaped mirror is matched to the shape at which the angle of a light beam is received. The gimbal frame used by the dual axis mirror is attached to a support frame by another set of torsional hinges.

Texas Instruments also manufactures a single axis mirror comprising two layers of silicon and a magnet. The multi-layered mirror allows the selecting of the most effective torsional hinge while at the same time reduces the flexibility or bending of the mirror surface at high oscillation speeds.

These mirrors manufactured by Texas Instruments are particularly suitable for use as the scanning engine for high-speed laser printers and visual display.

According to the prior art, torsional hinge mirrors were initially driven directly by magnetic coils interacting with small magnets mounted on the pivoting mirror at a location orthogonal to and away from the pivoting axis to oscillate the mirror or create the sweeping movement of the beam. In a similar manner, orthogonal movement of the beam sweep was also controlled by magnetic coils interacting with magnets mounted on the gimbals frame at a location orthogonal to the axis used to pivot the gimbals frame. Inexpensive and dependable magnetic drives can also be used and set up in such a way to maintain the pivoting device at its resonant frequency. Further, although the reflecting surface of a scanning mirror can be of almost any shape, including square, round, elliptical, etc., an elongated elliptical shape has been found to be particularly suitable.

SUMMARY OF THE INVENTION

These and other problems are generally solved or circumvented, and technical advantages are generally achieved, by preferred embodiments of the present invention that provide methods and apparatus of generating lines of data on a light sensitive medium such as a rotating drum for a printer or a screen for a display system.

In accordance with embodiments of the present invention, a reflective surface such as a torsional hinged mirror is oscillated about a first pivot axis and a multiplicity of modulated and parallel light beams are directed onto the oscillating reflective surface. The multiplicity of modulated and parallel light beams are then reflected from the oscillating reflective surface to sweep the multiplicity of light beams back and forth across the light sensitive medium in a forward and a reverse direction. Relative orthogonal movement between the light sensitive medium and the forward and reverse directions of the sweeping light beams is provided by a moving medium such as a rotating drum when used with a printer. However, for a display device, the sweeping multiple light beams are typically moved by moving the group of beams orthogonally to the direction of the sweeping beam. This movement may be accomplished by using a dual axis mirror or alternately, using a second mirror to provide the orthogonal motion. A multiplicity of selected data lines are generated on the light sensitive medium as the multiplicity of modulated and parallel light beams sweep across the light sensitive medium.

According to another embodiment, the multiplicity of selected data lines are generated as the multiplicity of light beams sweep across the light sensitive medium in a forward direction and the same multiplicity of selected data lines are again generated as the multiplicity of light beams sweep across the light sensitive medium in the reverse direction. However, each light beam of the multiplicity of light beams provide a different one of the multiplicity of selected data lines in the reverse direction than they provided in the forward direction. To achieve proper line spacing on a printed page or a display, the multiplicity or number "N" of modulated and parallel light beams are equally spaced apart by a distance "S" and the relative orthogonal movement between the light sensitive medium and the sweeping light beam during one complete back and forth cycle is equal to a distance (S) times (N).

According to another embodiment, two light beams are used such that a first line of data is generated with a first one of the two light beams and a second line of data is generated with a second one of the two light beams as the first and second light beams move in a forward direction across the light sensitive medium. Then, the second line of data is again generated with the first light beam and the first line of data is again generated with the second light beam as the first and second light beams move in the reverse direction across the light sensitive medium.

According to still another embodiment, the multiplicity of light beams comprise a first light beam, a second light beam, a third light beam and a fourth light beam, such that the first, second, third and fourth selected data lines are generated with the first, second, third and fourth light beams respectively as the light beams sweep across the light sensitive medium in the forward direction and the first, second, third and fourth selected data lines are generated a second time with the third, fourth, first and second light beams respectively as the light beams sweep across the light sensitive medium in the reverse direction.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 1A, 1B, and 1C illustrate the use of a rotating polygon mirror for generating the sweep of a laser printer according to the prior art;

FIGS. 13A and 13B show the pattern two and four equally spaced bi-directional modulated laser beams, respectively, generated on a photosensitive medium.

DETAILED DESCRIPTION OF ILLUSTRATIVE EMBODIMENTS

Figure 2A:
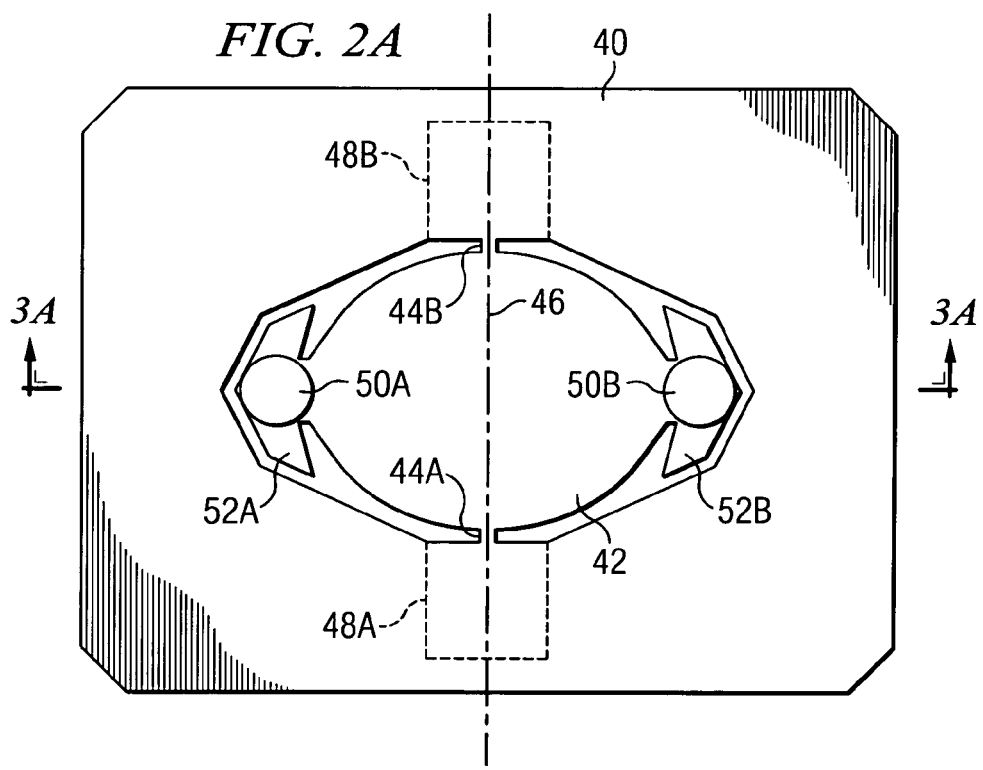
FIGS. 2A, 2B and 2C are embodiments of single axis torsional hinge pivoting devices having a mirror as the functional surface.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Like reference numbers in the figures are used herein to designate like elements throughout the various views of the present invention. The figures are not intended to be drawn to scale and in some instances, for illustrative purposes, the drawings may intentionally not be to scale. One of ordinary skill in the art will appreciate the many possible applications and variations of the present invention based on the following examples of possible embodiments of the present invention. The present invention relates to a high-speed pivoting reflective surface or mirror and is particularly suited for providing the raster scans for laser printers and displays. More specifically, the invention relates to a high-speed resonant pivoting mirror about a pair of torsional hinges used to reflect a multiplicity of equally spaced parallel laser beams.

Referring now to FIGS. 1A, 1B and 1C, there is shown an illustration of the operation of a prior art printer using a rotating polygon mirror. As shown in FIG. 1A, there is a rotating polygon mirror 10 which in the illustration has eight reflective surfaces 10a–10h. A light source 12 produces a beam of light 14a, such as a laser beam, that is focused on the rotating polygon mirror so that the beam of light from the light source 12 is intercepted by the facets 10a–10h of rotating polygon mirror 10. Thus, the laser beam of light indicated at 14a from the light source 12 is reflected from the facets 10a–10h of the polygon mirror 10 as illustrated by dashed line 14b to a moving photosensitive medium 16 such as a rotating photosensitive drum 18 having an axis of rotation 20. The moving photosensitive medium 16 or drum 18 rotates around axis 20 in a direction as indicated by the arcurate arrow 22 such that the area of the moving photosensitive medium 16 or drum 18 exposed to the reflected light beam 14b is continuously changing. As shown in FIG. 1A, the polygon mirror 10 is also rotating about an axis 24 (axis is perpendicular to the drawing in this view) as indicated by the second arcurate arrow 26. Thus, it can be seen that the leading edge 28 of facet 10b of rotating polygon mirror 10 will be the first part of facet 10b to intercept the laser beam of light 14a from the light source 12, and reflect the light beam as indicated at 14b toward the photosensitive medium. As the mirror 10 rotates, each of the eight facets of the mirror 10 will intercept the light beam 14a in turn, and reflect a light beam 14b. As will be appreciated by those skilled in the art, the optics to focus the light beam, the lens system to flatten the focal plane to the photosensitive drum, and any fold mirrors to change the direction of the scanned beam are omitted for ease of understanding.

Illustrated below the rotating polygon mirror 10 is a second view of the photosensitive medium 16 or drum 18 as seen from the polygon scanner. As shown by the photosensitive drum view 18, there is the beginning point 30 of an image of the laser beam 14b on drum 18 immediately after the facet 10b intercepts the light beam 14a and reflects it to the moving photosensitive medium 16 or drum 18.

Referring now to FIG. 1B, there is shown substantially the same arrangement as illustrated in FIG. 1A except the rotating polygon mirror 10 has continued its rotation about axis 24 such that the facet 10b has rotated so that its interception of the laser beam 14a is about to end. As will also be appreciated by those skilled in the art, because of the varying angle the mirror facets present to the intercepted light beam 14a, the reflected light beam 14b will move across the surface of the rotating drum as shown by arrow 32 and dashed line 34 in FIG. 1B.

However, it will also be appreciated that since rotating drum 18 was moving orthogonally with respect to the scanning movement of the light beam 14b, that if the axis of rotation 24 of the rotating mirror was exactly orthogonal to the axis 20 of the rotating photosensitive drum 18, an image of the sweeping or scanning light beam on the photosensitive drum would be recorded at a slight angle. As shown more clearly by the lower view of the photosensitive drum 18, dashed line 34 illustrates that the trajectory of the light beam 14b is itself at a slight angle, whereas the solid line 36 representing the resulting image on the photosensitive drum is not angled but orthogonal to the rotation or movement of the photosensitive medium 16. To accomplish this parallel printed line image 36, the rotating axis 24 of the polygon mirror 10 is typically mounted at a slight tilt with respect to the rotating photosensitive drum 18 so that the amount of vertical travel or distance traveled by the light beam 14b along vertical axis 38 during a sweep or scan across medium 16 is equal to the amount of movement or rotation of the photosensitive medium 16 or drum 18. Alternately, if necessary, this tilt can also be accomplished using a fold mirror that is tilted.

FIG. 1C illustrates that facet 10b of rotating polygon mirror 10 has rotated away from the light beam 14a, and facet 10c has just intercepted the light beam. Thus, the process is repeated for a second image line. Continuous rotation will of course result in each facet of rotating mirror 10 intercepting light beam 14a so as to produce a series of parallel and spaced image lines, such as image line 36a, which when viewed together will form a line of print or other image.

It will be further appreciated by those skilled in the laser printing art, that the rotating polygon mirror is a very precise and expensive part or component of the laser printer that must spin at terrific speeds without undue wear of the bearings even for rather slow speed printers. Therefore, less complex torsional hinged resonant flat mirrors are rapidly gaining increased acceptance.

Figure 2B:
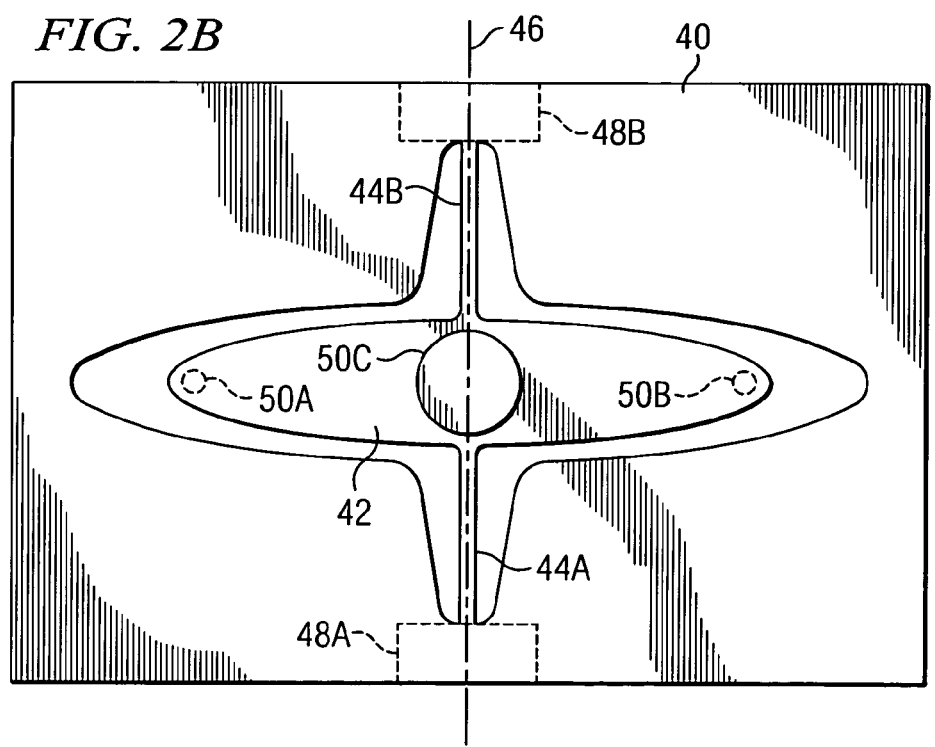

FIGS. 2A and 2B illustrate single layered single axis torsional mirror devices. Each of the devices of FIGS. 2A and 2B include a support member 40 supporting the mirror or reflective surface 42, which may be substantially any shape but for many printer and display applications the elongated ellipse shape of FIG. 2B is preferred. The pivoting mirror is supported by a single pair of torsional hinges 44a and 44b. Thus, it will be appreciated that if the mirror 42 can be maintained in an oscillation state around axis 46 by a drive source, such a mirror could be used to cause a sweeping light beam to repeatedly move across a photosensitive medium.

It will also be appreciated that an alternate embodiment of a single axis device may not require the support member or frame 40 as shown in FIGS. 2A and 2B. For example, as shown in both figures, the torsional hinges 44a and 44b may simply extend to a pair of hinge anchor pads 48a and 48b as shown in dotted lines. The functional surface, such as mirror 42, may be suitably polished on its upper surface to provide a specular or mirror surface.

The single layered silicon mirrors are typically MEMS (micro-electric mechanical systems) type mirrors manufactured from a slice of single crystal silicon. Further, because of the advantageous material properties of single crystalline silicon, MEMS based mirrors have a very sharp torsional resonance. The Q of the torsional resonance typically is in the range of 100 to over 1000. This sharp resonance results in a large mechanical amplification of the device's motion at a resonance frequency versus a non-resonant frequency. Therefore, it is typically advantageous to pivot a device about the scanning axis at the resonant frequency. This dramatically reduces the power needed to maintain the mirror in oscillation.

Figure 2C:
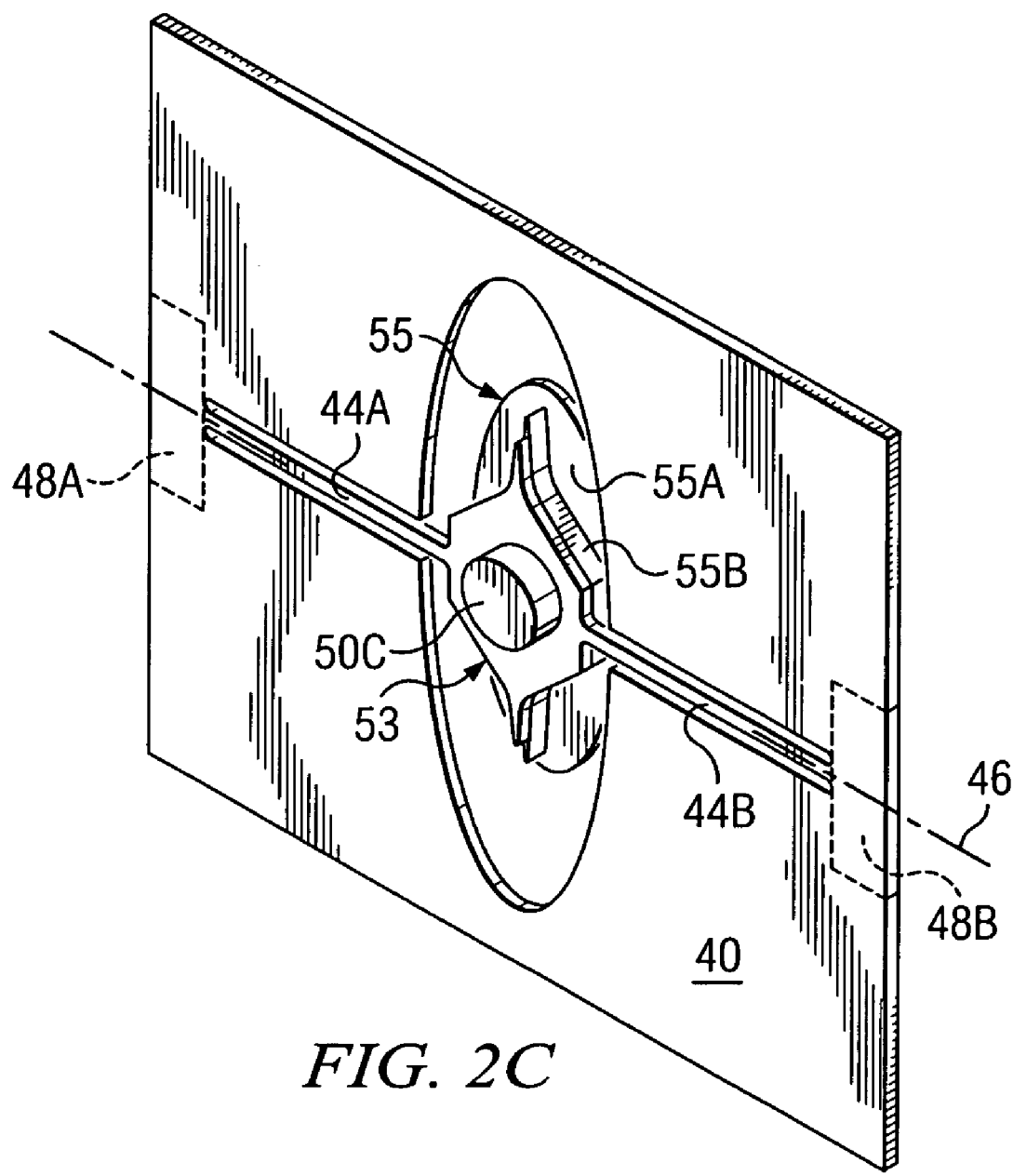

FIG. 2C is a backside view of a multilayered single axis torsional mirror device somewhat similar to the single layered elongated ellipse shape illustrated in FIG. 2B. Components of the mirror device of FIG. 2C that are the same as in the mirror of FIG. 2B carry the same reference numbers. However, unlike the single layered mirror of FIG. 2B, the torsional hinges do not extend between the anchors 48a and 48b and the reflecting portion. Instead, the torsional hinges extend to an attaching member 53, having a front side and a back side. The permanent magnet 50c is attached to the back side and the mirror portion 55 is attached to the front side. Mirror portion 55 could be a single flat layer of silicon or preferably, as shown in FIG. 2C, comprise a single piece of silicon that includes a thin reflecting portion 55a and a thick rib support portion 55b etched from the single layer mirror portion 55 so as to provide the support rib as shown.

There are many possible drive mechanisms available to provide the oscillation or pivoting motion if the mirror is intended to provide an oscillating beam sweep along the scan axis. For example, FIG. 2A illustrates a magnetic driven mirror having a pair of permanent magnets 50a and 50b mounted on tabs 52a and 52b respectively. The permanent magnets 50a and 50b interact with a pair of coils (to be discussed later) located below the pivoting structure. The mechanical motion of the mirror in the scan axis, or about the hinges 44a and 44b, is typically required to be greater than 15 degrees and may be as great as 30 degrees. Rather than being driven by a pair of magnets 50a and 50b shown in dotted lines, FIG. 2B illustrates the use of a single magnet 50c centrally located on the mirror 42. The drive mechanism for a centrally located single magnet 50c is discussed below. Resonant drive methods typically involve applying a small rotational motion at or near the resonant frequency of the mirror directly to the torsionally hinged functional surface. Alternately, an inertial drive may provide motion at the resonant frequency to the whole structure, which then excites the mirror to resonantly pivot or oscillate about its torsional axis. In inertial resonant type of drive methods a very small motion of the whole silicon structure can excite a very large rotational motion of the device. Suitable inertial resonant drive sources include piezoelectric drives and electrostatic drive circuits.

Further, by carefully controlling the dimension of hinges 44a and 44b (i.e., width, length and thickness) the mirror may be manufactured to have a natural resonant frequency which is substantially the same as the desired operating pivoting speed or oscillating frequency of the mirror. Thus, by providing a mirror with a high-speed resonant frequency substantially equal to the desired pivoting speed or oscillating frequency, the power loading may be reduced.

Figure 3A:
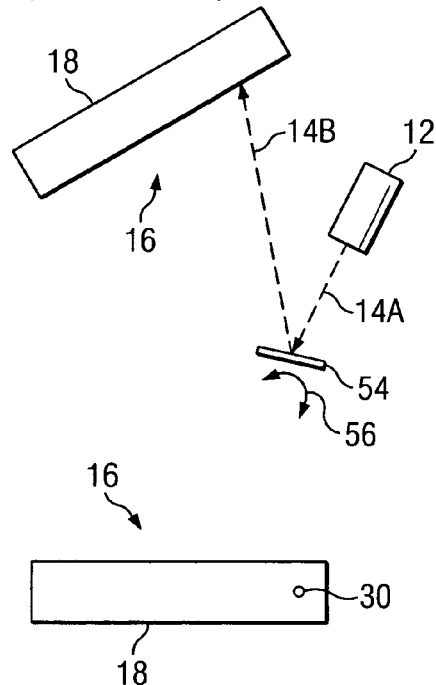
FIGS. 3A, 3B, 3C, and 3D illustrate a prior art example of using a single axis flat scanning mirror to generate a unidirectional beam sweep of a laser printer.
Figure 3B:
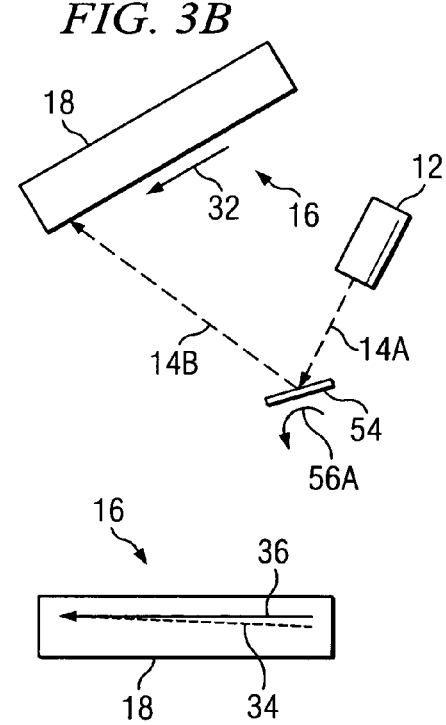
Figure 3C:
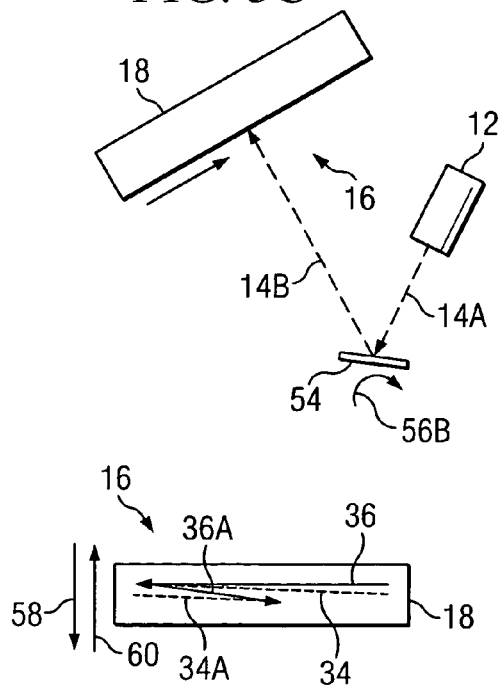

Referring now to FIGS. 3A, 3B, 3C and 3D, there is illustrated a prior art example of a laser printer using a single-axis oscillating mirror to generate the beam sweep. As will be appreciated by those skilled in the art and as illustrated in the following figures, prior art efforts have typically been limited to only using one direction of the oscillating beam sweep because of the non-parallel image lines generated by the return sweep. As shown in FIGS. 3A, 3B, 3C and 3D, the arrangement is substantially the same as shown in FIGS. 1A, 1B and 1C except that the rotating polygon mirror has been replaced with a single oscillating flat mirror 54 that oscillates in both directions as indicated by double headed arcuate arrow 56. As was the case with respect to FIG. 1A, FIG. 3A illustrates the beginning of a beam sweep at point 30 by the single axis mirror 54. Likewise, arrow 32 and dashed line 34 in FIG. 3B illustrate the direction of the beam sweep as mirror 54 substantially completes its scan as it rotates in a direction as indicated by arrow 56a. Referring to the lower view of the photosensitive drum 18, according to this prior art embodiment, the mirror 54 is mounted at a slight angle such that the beam sweep is synchronized with the movement of the rotating drum 18 so that the distance the medium moves is equal to the vertical distance the light beam moves during a sweep. As was the case for the polygon mirror of FIG. 1B, the slightly angled trajectory of the beam as illustrated by dashed line 34 results in a horizontal image line 36 on the moving photosensitive medium 16 or drum 18.

Figure 3D:
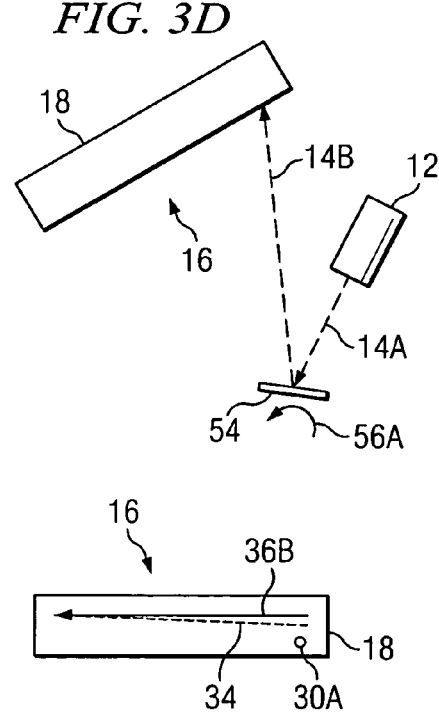

Thus, up to this point, it would appear that the flat surface single torsional axis oscillating mirror 54 should work at least as well as the rotating polygon mirror 10 as discussed with respect to FIGS. 1A, 1B, and 1C. However, when the oscillating mirror starts pivoting back in the opposite direction as shown by the arcuate arrow 56b, with prior art scanning mirror printers, it was necessary to turn the beam, indicated by dashed line 34a in FIG. 3C, off and not print during the return sweep since the vertical movement of the reflected beam resulting from the mirror being mounted at a slight angle and the movement of the moving photosensitive medium 16 or rotating drum 18 were cumulative rather than subtractive. Consequently, if used for printing, the angled trajectory 34a of the return beam combined with movement of the rotating drum 18 would result in a printed image line 36a which is at even a greater angle than what would occur simply due to the movement of the rotating photosensitive drum 18. This, of course, is caused by the fact that as the beam sweep returns, it will be moving in a downward direction, as indicated by arrow 58, rather than an upward direction, whereas the photosensitive drum movement is in the upward direction indicated by arrow 60. Thus, as stated above, the movement of the drum and the beam trajectory are cumulative. Therefore, for satisfactory printing by a resonant scanning mirror printer according to the prior art, it was understood that the light beam and the printing were typically interrupted and/or stopped during the return trajectory of the scan. Thus, the oscillating mirror 54 was required to complete its reverse scan and then start its forward scan again as indicated at 30, at which time the modulated laser was again turned on and a second image line 36b printed as indicated in FIG. 3D.

It will also be appreciated, however, that if the position of the scanning beam orthogonal to the sweeping motion could be controlled to compensate for the rotating or moving photosensitive medium, the laser beam could be on and modulated in both its forward and reverse scanning directions. Such orthogonal movement may be achieved by using a dual axis scanning mirror or using a first single axis resonant mirror to provide the resonant beam sweep and a second single axis mirror to provide the controlled orthogonal motion.

Figure 4A:
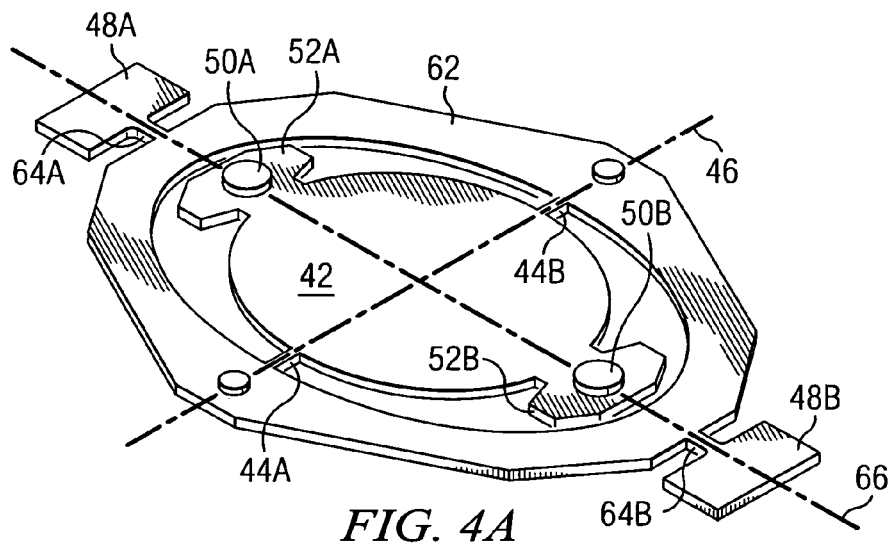
FIGS. 4A and 4B show two examples of a dual axis mirror suitable for use in a laser printer or display.
Figure 4B:
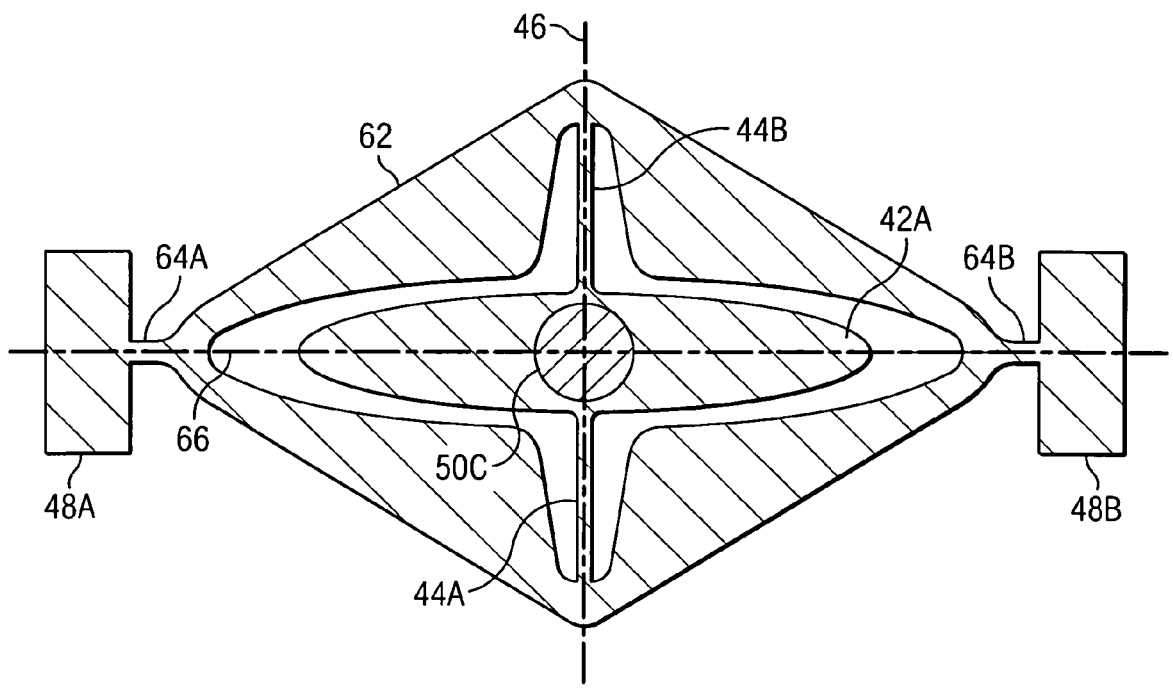

Referring now to FIGS. 4A and 4B, there are illustrated two embodiments of dual axis mirrors. As can readily be seen, these mirrors are similar to the single axis mirrors of FIGS. 2A and 2B, respectively, discussed above. However, instead of the primary or resonant hinges 44a and 44b, which lie along resonant axis 46, being attached directly to anchor pads 48a and 48b, the primary hinges 44a and 44b are connected to a gimbals member 62, which in turn is connected to the anchor pads 48a and 48b by a second pair of hinges 64a and 64b. Hinges 64a and 64b provide pivotal motion to the mirror 42 along secondary axis 66, which is substantially orthogonal to axis 46.

As shown, FIG. 4A is a perspective view of a single two-axis bi-directional mirror providing resonant movement about the first axis 46 and movement about a second axis 66 that is substantially orthogonal to the first axis. The mirror device can be used to provide back and forth pivoting beam sweeps such as resonant scanning across a projection display screen or moving photosensitive medium as well as adjusting the beam sweep in a direction orthogonal to the back and forth pivoting of the reflective surface or mirror portion 42 to maintain spaced parallel image lines produced by a resonant raster beam sweep. As shown, the mirror is illustrated as being suitable for being mounted on a support structure, and may be formed from a single piece of substantially planar material (such as silicon) by techniques similar to those used in semiconductor art. As discussed above, the functional or moving components include, for example, a pair of support members or anchors 48a and 48b, the intermediate gimbals portion 62 and the inner mirror or reflective surface portion 42.

FIG. 4B is an alternate embodiment of a dual axis mirror having an elongated oval mirror portion 42a and a centrally located drive magnet 50c. Since the remaining elements of the device shown in FIG. 4B operate or function in the same manner as equivalent elements of FIG. 4A, the two figures use common reference numbers.

Figure 5:
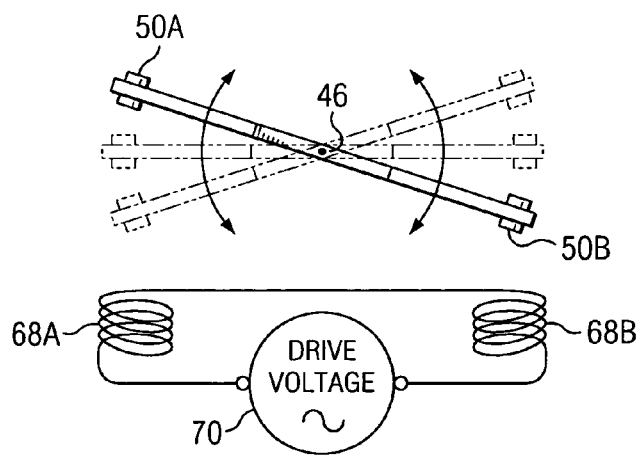
FIG. 5 illustrates one method of magnetically driving a resonant mirror using a pair of magnets.

FIG. 5 is a schematic diagram illustrating how the resonant sweep and/or the orthogonal motion is controlled by electromagnetic coils 68a and 68b. To provide the resonant pivoting motion, the coils 68a and 68b are driven by an alternating voltage source 70 having a frequency substantially the same as the resonant frequency of the mirror. The permanent magnet sets 50a and 50b may be bonded to the mirror 42 (or gimbals portion 62) such that they cooperate with electromagnetic coils 68a and 68b. Thus, as the two coils 68a and 68b switch back and forth between north and south polarities, the permanent magnets 50a and 50b are alternately repelled and attracted to create the resonant oscillation. If the coil arrangement and magnet pairs are to provide orthogonal movement, a much slower frequency is used.

Figure 6:
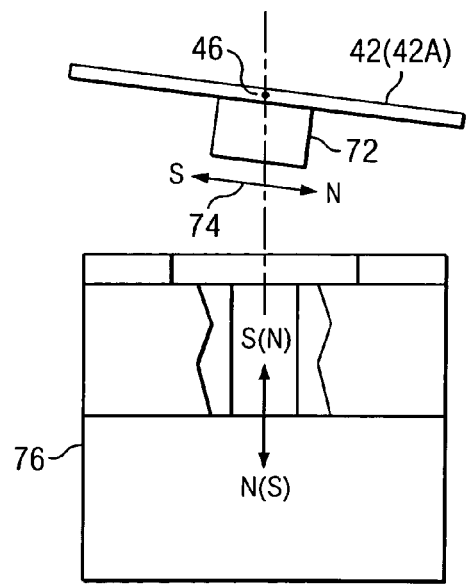
FIG. 6 illustrates a single magnet drive for providing resonant oscillations.

Referring now to FIG. 6, there is a simplified illustration of a pivoting mirror 42 or 42a and another coil and permanent magnet arrangement that significantly reduces the moment of inertia of the apparatus. As shown, the two permanent magnets have been eliminated and a single magnet 72 is centrally mounted on the pivoting mirror (such as shown in FIG. 4B). According to the embodiment shown in FIG. 6, magnet 72 has a diametral charge that is perpendicular to the axis of rotation, as illustrated by double-headed arrow 74, rather than an axial charge. It will, of course, also be necessary to relocate the drive coil 76 of the electromagnetic device 77 so that it is substantially below magnet 72. Therefore, as the electromagnetic device 77 switches back and forth between a north and south polarity, the "N" and "S" diametrally charged poles of permanent magnet 72 are alternately repelled and attracted thereby causing pivotal oscillations about axis 46.

Figure 7:
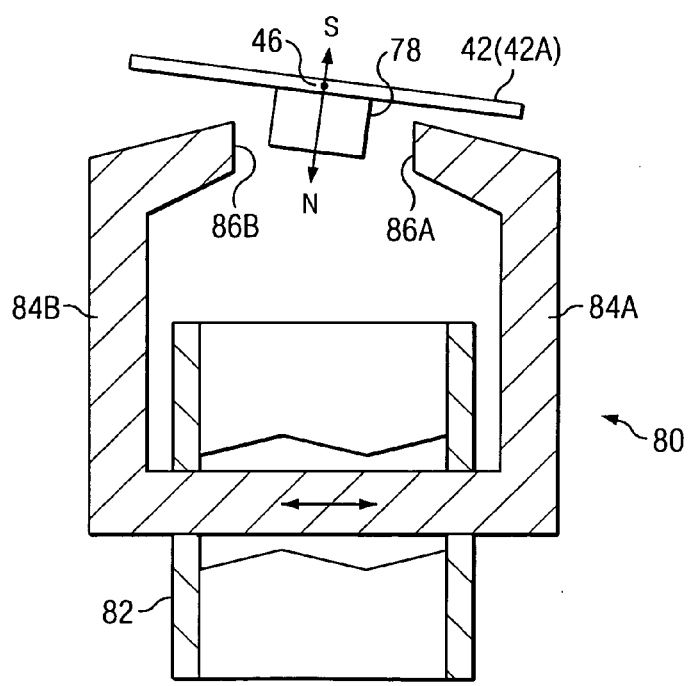
FIG. 7 illustrates another embodiment of a single magnet drive.

FIG. 7 shows a second drive arrangement suitable for use with a single magnet centrally located. As shown, an axial charged magnet 78 is used instead of the diametral charged magnet of FIG. 6. Further, the coil 76 shown in FIG. 6 is replaced by an electromagnetic arrangement 80, having a coil 82 and leg members 84a and 84b that extend from the coil 82 to tips 86a and 86b on each side of the magnet 78. Thus, an alternating current applied to coil 82 causes the magnetic field at the tips 86a and 86b of legs 84a and 84b to continuously change polarity. This change in polarity creates alternating push-pull forces on magnet 78.

Figure 8:
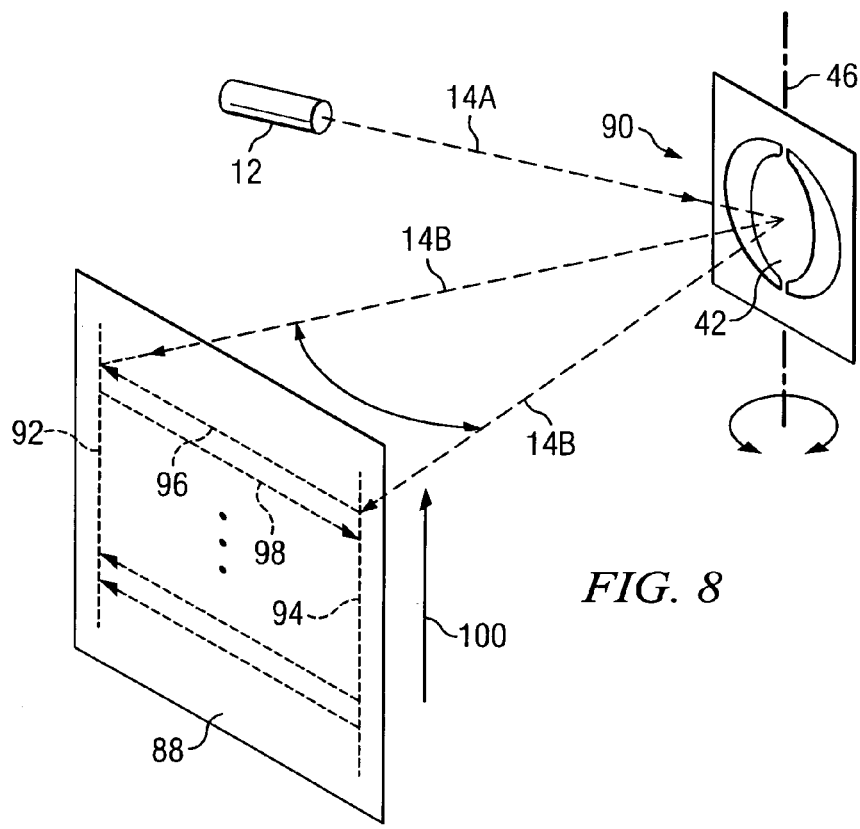
FIG. 8 is a perspective illustration of a single axis mirror, such as illustrated in FIGS. 2A and 2B to generate the beam sweep of a laser printer.

FIG. 8 illustrates a perspective illustration of a scanning mirror used to generate an image on a medium 88. The mirror device 90, such as a single axis mirror of the type shown in FIGS. 2A and 2B, pivots about its single axis 46 so that the reflecting surface 42 of the mirror device 90 receives the light beam 14a from source 12 and provides the right to left and left to right resonant sweep of beam 14b between limits 92 and 94. This left to right and right to left beam sweep provides the spaced lines 96 and 98 as the medium 88 moves in the direction indicated by arrow 100.

It will also be appreciated that although various shapes of the mirror can be used in the practice of this invention, the demand for higher and higher operating speeds will require a higher and higher oscillation speed of the mirror around the primary or scan axis 46. However, in addition to high-speed pivoting of the scanning mirrors, it is also important that the mirror not deform as it pivots. More specifically, it is important that the mirror not deform as it sweeps the laser beam across the photosensitive medium during a scan cycle. Consequently, for high-speed resonant mirrors, magnetic drives using a single centrally located mirror has reduced momentum at the edges of the mirror and, consequently, less deformation.

More specifically, at high pivoting speeds, the tips of the preferred elongated elliptical mirror shown in FIG. 2B travel at very high speeds and gain significant intertia. Consequently, if the permanent magnets 50a and 50b are attached to the tips of an elongated ellipse mirror such as shown in FIG. 2B, the mirror will tend to flex excessively proximate the torsional hinges and at the tips. This excessive flexing of course means that during some portions of the oscillating cycle, the mirror surface bends or flexes and is not flat. This variation in mirror flatness at high frequencies is simply unacceptable for many displays and printers. However, the use of the centrally located mirror 50c not only avoids excess weight at the tips of the mirror, but also provides stiffness to the center of the mirror.

Figure 9:
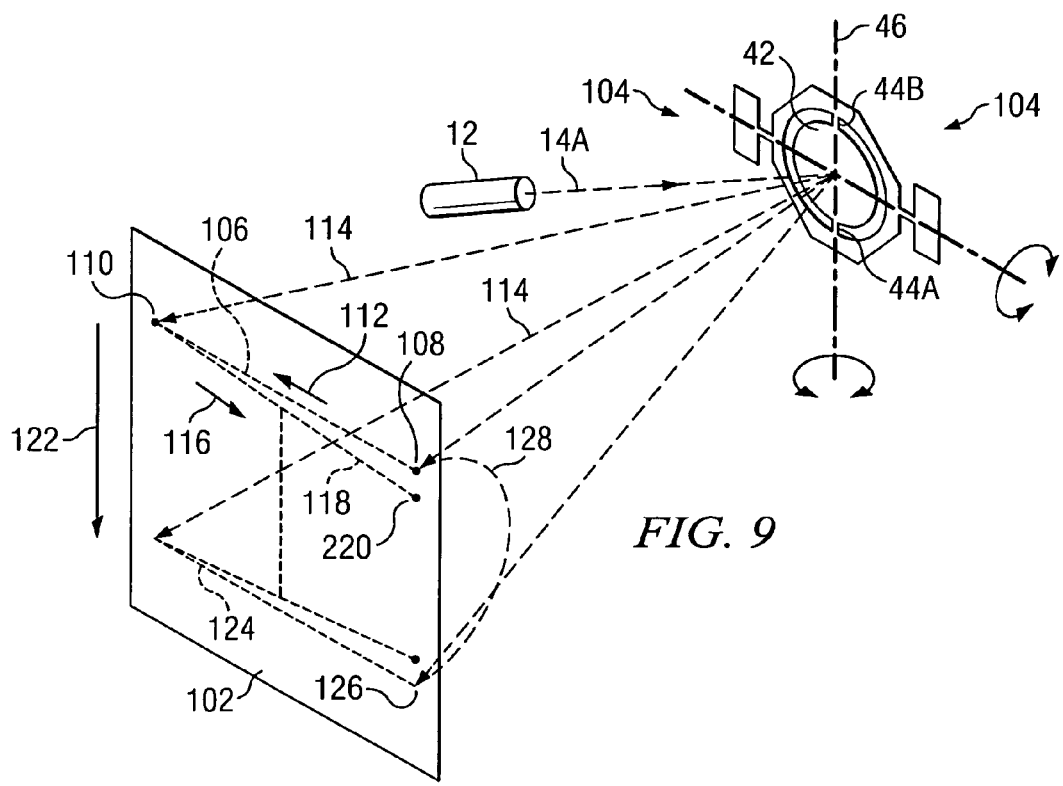
FIG. 9 is a perspective illustration of a dual axis mirror arranged for use with a laser printer or laser display.

The operation of a dual axis mirror, such as shown in FIGS. 4A and 4B for providing pivoting beam sweep with respect to a projection display screen 102, may be better understood by referring to FIG. 9. As shown, a laser light source 12 provides a coherent beam of light 14a to the reflective surface 42 of a dual axis mirror apparatus 104, which in turn reflects the beam of light 14b onto a display screen 102. Reflective surface 42 oscillates back and forth at a resonant frequency about torsional hinges 44a and 44b along axis 46 and thereby sweeps the beam 14b across display screen 102 along image line 106 from location or point 108 to end point 110 as indicated by arrow 112 parallel to the light beam labeled 114. The oscillating mirror 42 then changes direction and starts the return sweep as indicated by arrow 116 to produce image line 118 between points 110 and 120. After passing point 120, the beam again begins reversing direction. At the same time the beam is sweeping back and forth, the beam may also be moved orthogonally at a much slower rate as indicated at arrow 122. This sweeping motion and orthogonal motion is repeated until the last image line 124 of a display frame ending at point 126 is produced on display screen 102. The beam is then orthogonally quickly moved from end point 126 back to start point 108 as indicated by dashed line 128 to start a new display frame.

Figure 10:
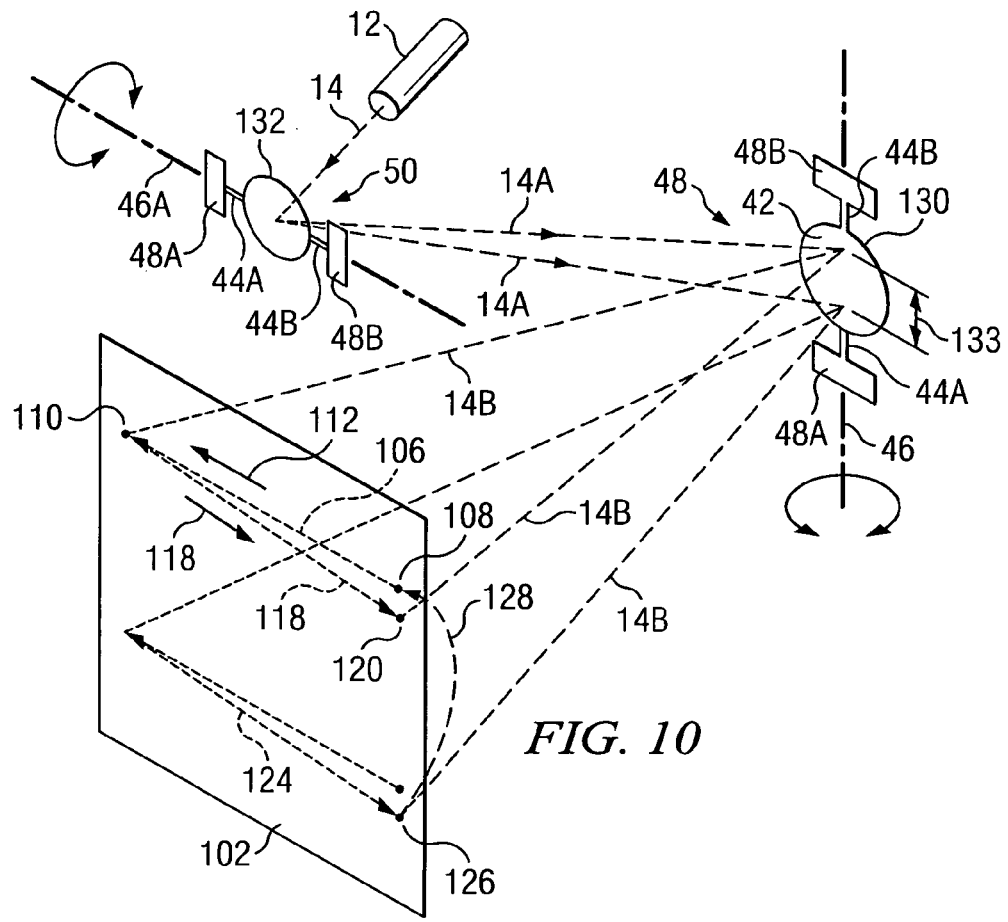
FIG. 10 is a perspective illustration of the single axis mirror arrangement for use with a laser printer or laser display.

Referring to FIG. 10 there is a perspective illustration of another embodiment of the present invention wherein the orthogonal movement of the beam is accomplished by a second mirror 132. Each of the two mirrors 130 and 132 pivot about a single axis, such as the single axis mirrors of the type shown in FIGS. 2A and 2B. The scanning and orthogonal operation of the two single axis mirrors is otherwise substantially the same.

Therefore, according to another embodiment of the invention, FIG. 10 illustrates a first single axis torsional hinged mirror used in combination with a second similar single axis torsional mirror to provide a resonant sweeping beam such as may be used with a projection display (or laser printer). As shown in this embodiment, there is a first mirror apparatus 130 that includes a pair of support members or anchors 48a and 48b supporting a mirror or reflective surface 42 by the single pair of torsional hinges 44a and 44b. Thus, it will be appreciated that if the mirror portion 42 can be pivoted back and forth by a drive source, the mirror can be used to cause an oscillating light beam across a photosensitive display. As discussed, a particular advantageous method of pivoting the mirror back and forth is to generate resonant oscillation of the mirror about the torsional hinges 44a and 44b. However, as was also discussed, there also needs to be a method of moving the light beam in a direction orthogonal to the oscillation. Therefore, a second single axis mirror apparatus 132, such as illustrated, is used to provide the vertical movement of the light beam as it pivots about its axis 46.

As discussed above, the optical system of the embodiment of FIG. 10 uses single axis mirror apparatus 130 to provide the right to left, left to right pivoting of the light beam as represented by dotted lines. However, the up and down control of the beam trajectory is achieved by locating the second single axis mirror apparatus 132 such that the reflective surface or mirror intercepts the light beam 14 emitted from light source 12 and then reflects the intercepted light 14a to the mirror apparatus 130 which is providing the back and forth pivoting sweep motion. The distance 133 shown on mirror surface 42 of resonant mirror 130 illustrates how the mirror 132 rotates around axis 46 to move the light beam 14a up and down on reflective surface 42 of mirror apparatus 130 during the left to right and right to left beam sweep so as to provide data lines 106, 118 and 124 on a projection display screen.

Figure 11:
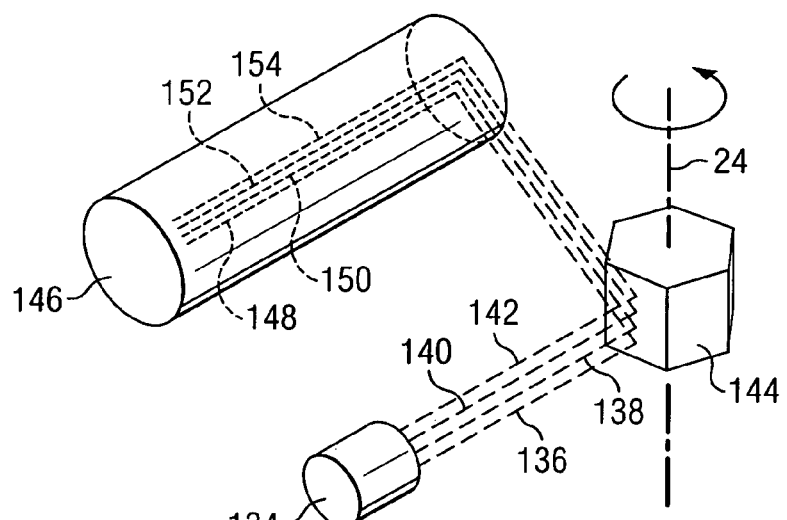
FIG. 11 illustrates the use of a prior art polygon mirror to reflect a multiplicity of equal spaced parallel laser beams.

As was mentioned above, in an attempt to increase printing speed, printer manufacturers that use rotating polygon mirrors sometimes use a multiplicity of equally spaced and parallel laser beams to increase the number of data lines generated on a photosensitive medium during a single sweep. Referring now to FIG. 11, there is an illustration of a laser beam source 134 having four beam outputs 136, 138, 140 and 142 that are reflected from rotating polygon mirror 144 onto rotating photosensitive drum 146. The process is substantially the same as for a single beam except that it is important to assure that the data lines generated by a first facet of the polygon mirror are properly spaced with respect to the lines generated by a second and subsequent facet.

More specifically, since the multiple laser beams, such as beams 136, 138, 140 and 142, are at a fixed and equal distance apart, it is clear that the four data lines 148, 150, 152 and 154 generated on the photosensitive medium by a first facet will be equally spaced and parallel to each other. Furthermore, the next four data lines 148, 150, 152 and 154 generated by the next or following facet will also be equally spaced and parallel. However, it is also important that the first data line 148 generated by the second facet be equally spaced and parallel to the last data line 154 generated by the first or previous facet. To accomplish this, the moving medium or rotating drum 146 should move a distance "D" during a single complete sweep of the four beams across the moving medium that is equal to the spacing "S" between the laser beams times the number "N" of laser beams. That is, D=(S)(N). Therefore, it is seen that the only requirement of using multiple beams with a polygon mirror is that the rotation speed of the polygon mirror and the moving photosensitive medium be carefully synchronized.

Figure 12:
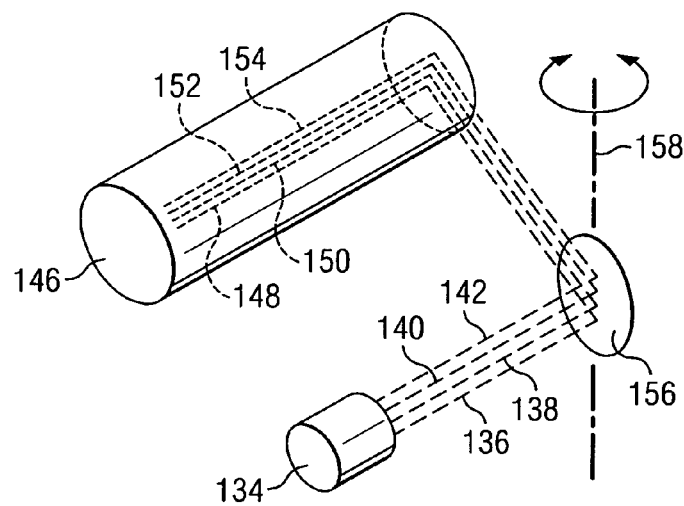
FIG. 12 illustrates the use of a torsional hinged pivoting mirror to reflect a multiplicity of equally spaced parallel laser beams.

The use of multiple laser beams with a resonant bi-directional scanning mirror is significantly more difficult and, for most applications, will be limited to an even number of laser beams, although the physical arrangement is substantially identical to a polygon mirror and multilaser beams. Referring now to FIG. 12, there is a perspective view similar to that of FIG. 11, except a resonant bi-direction scanning mirror 156 pivoting about axis 158 is used instead of the polygon mirror. The advantage arises because the top traces of the reverse or return sweep will cross the bottom or lower traces generated by the previous forward sweep. Therefore, it is necessary that the crossing traces carry the same data. As will be seen below, this double printing of each line allows parallel print lines without requiring a dual axis mirror and also provides greater intensity resolution per spot.

Figure 13A:
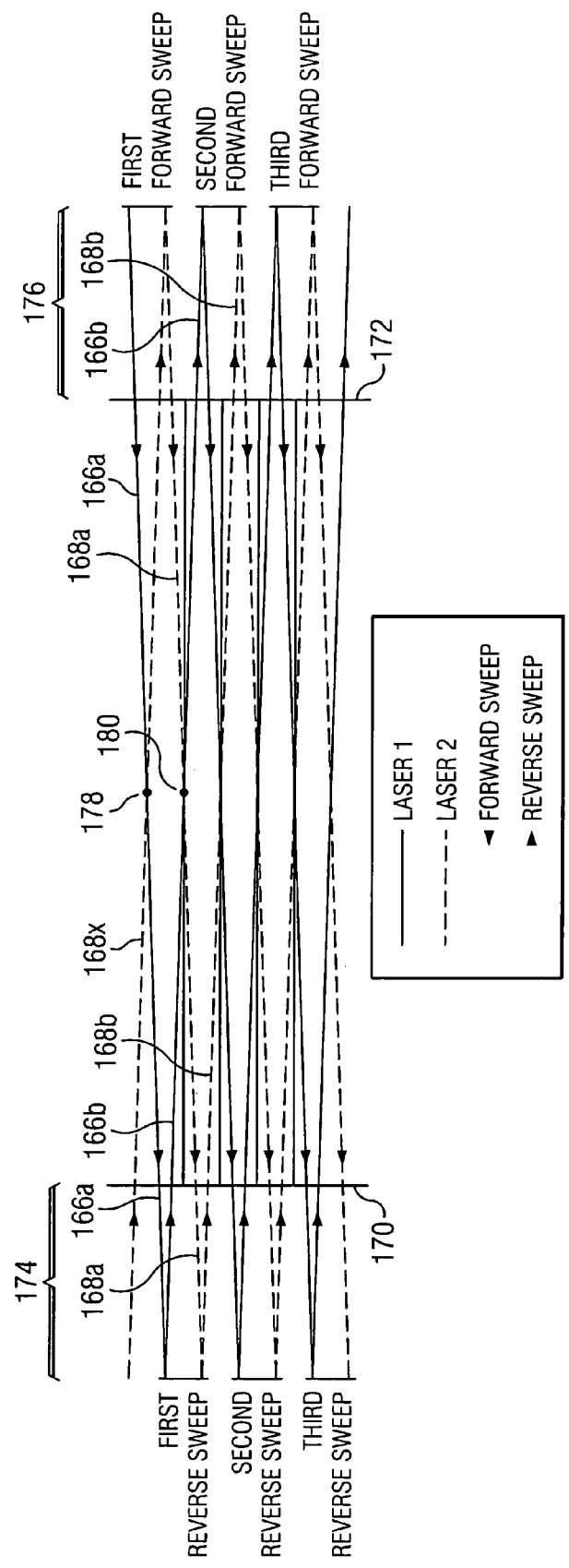

More specifically, and referring now to FIG. 13A, there is illustrated the traces of the two parallel laser beams 166 and 168 through four complete sweep cycles. As shown, the forward traces 166a and 168a are generated as laser beams 166 and 168 and move from right to left following by the reverse traces 166b and 168b moving left to right. The laser beams will be modulated only while the beams pass through the printing area bounded by left edge 170 and right edge 172. Since the oscillating mirror speed slows to zero at the end of each sweep before reversing direction, the sweep areas 174 and 176 on each side of the printing area allows the four beams to reach an acceptable speed before they are modulated with data. However, as shown in FIG. 13A, the top forward trace 166a provided by laser 166 crosses the reverse trace 168b of laser 168 from a previous cycle at crossover point 178. Likewise, the reverse trace 166b of laser 166 crosses the forward trace 168a of laser 168 of the same cycle at crossover point 180. This cycle is repeated over and over. Thus, it should be appreciated that if the forward trace of laser 166 is modulated the same as the reverse trace of laser 168 from the previous cycle but in reverse order, the two crossing traces of data lines should be identical. Likewise, if the reverse trace of laser 166 is modulated the same as the forward trace of laser 168 but in reverse order, these two crossing traces or data lines will also be identical. Therefore, for a two laser beam system, each data line is printed twice, once in each direction. However, two data lines or traces are printed for each sweep cycle. More specifically, each data line is printed one time each by both laser beams by traces that cross each other. Such double printing provides an inexpensive technique to increase the printing quality or speed.

As was discussed with respect to a rotating polygon mirror and a multilaser beam source, the speed of the relative movement between the sweeping multiple beams and the photosensitive medium receiving the laser beams should be synchronized to achieve the highest quality printing. Therefore, it should be appreciated that the total relative distance "D" moved between the sweeping laser beam and the photosensitive medium during a complete back and forth sweep cycle is equal to the space "S" between parallel lasers times the number "N" of multiple laser beams. That is, D=(S)(N) or, for a two laser beam system, D=2S.

If two laser beams can be used to increase printing quality or speed, it will be appreciated that the use of a laser source with four beams would allow even greater speed increase or allow an increase in both quality and speed.

Therefore, referring now to FIG. 13B, there is illustrated the traces generated by four equally spaced and parallel laser beams 182, 184, 186 and 188 reflected onto a moving photosensitive medium by an oscillating mirror. This trace diagram is similar to that of FIG. 13A showing two laser beams. However, although all four laser beams do cross each other at some point on the medium, as can be seen within the printing limits 190 and 192, laser beam 182 only crosses laser beam 186 whether traveling in the forward or reverse trace direction. Likewise, laser beams 184 and 188 only cross each other within the printing limits 190 and 192. Therefore, four different data lines 194, 196, 198 and 200 can be printed twice during each complete sweep cycle. More specifically, the first (194), the second (196), the third (198) and the fourth (200) data lines are generated with the first (182), second (184), third (186) and fourth (188) light beams, respectively, in a first or forward sweep direction, whereas the same first (194), second (196), third (198) and fourth (200) data lines are generated with the third (186), fourth (188), first (182) and second (184) laser beams, respectively, in the reverse or opposite direction.

Figure 14:
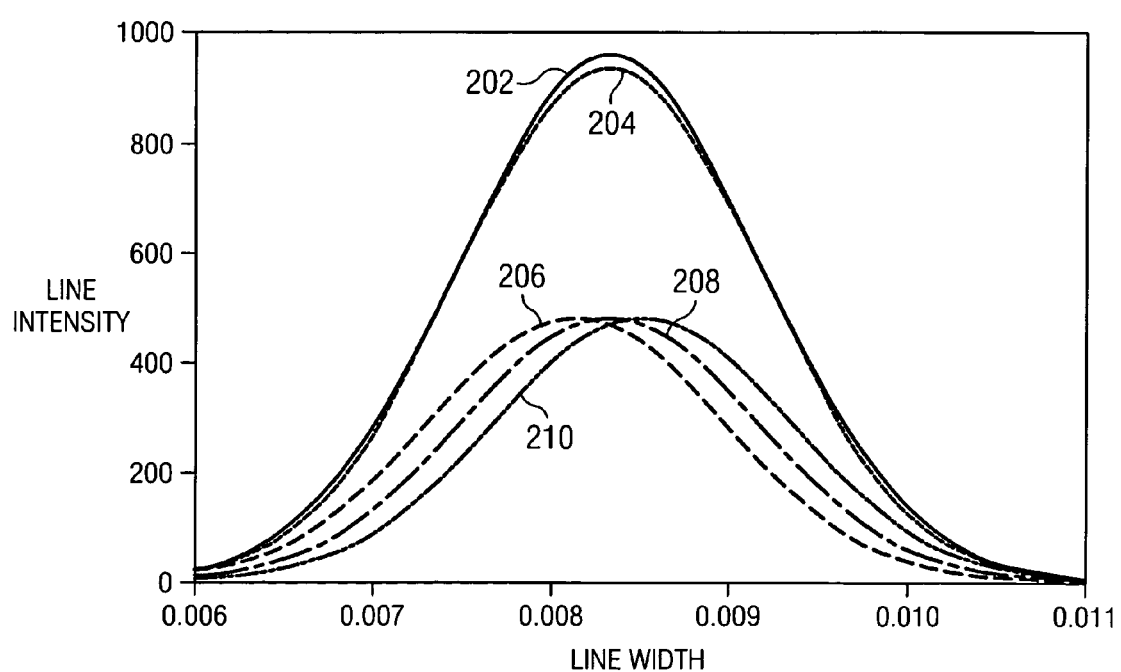
FIG. 14 is a graph illustrating line intensity at the center of a scan and the edge of a scan according to the teachings of the present invention.

Referring to FIG. 14, there is a graph illustrating the double traces line intensity of the left to right and right to left scans across the printing areas of the medium, as well as the line intensity across the printing area for the individual scans. As shown, the top curve 202 shows the intensity of the line in the center area created by both a combination of a forward sweep and a return sweep. Curve 204 is the line intensity of the line at the edges of the printing area as created by both a forward and reverse sweep. Curve 206 represents the line intensity at the edge of the printing area in a left to right scan of a single trace, whereas curve 210 represents the line intensity at the edge of the printing area in a right to left scan of a single trace. Curve 208 represents the line intensity at the center of the line or printing area of both a left to right and a right to left scan. As would be expected, so long as the output of the two lasers are substantially the same, traces of the line intensity of the two beams in the center areas are the same and fall on top of each other. Therefore, as shown by writing or generating each line twice, there is minimal intensity variation over the whole write line and the lines appear substantially parallel.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of generating lines of data on a light sensitive medium comprising the steps of:
    providing a light sensitive medium;
    oscillating a reflective surface about a first pivot axis;
    directing a multiplicity of modulated and parallel light beams onto said oscillating reflective surface;
    reflecting said multiplicity of modulated and parallel light beams from said oscillating reflective surface to sweep said light beams back and forth across said light sensitive medium in a forward and a reverse direction;
    providing relative orthogonal movement between said light sensitive medium and said forward and reverse directions of said sweeping light beams; and generating a multiplicity of selected data lines on said light sensitive medium as said multiplicity of modulated and parallel light beams sweep across said light sensitive medium, wherein said multiplicity of light beams is two light beams and wherein said generating step comprises the steps of:
    generating a first line of data with a first one of said two light beams and a second line of data with a second one of said two light beams as said first and second light beams move in said forward direction across said light sensitive medium; and
    generating said second line of data with said first light beam and said first line of data with said second light beam as said first and second light beams move in said reverse direction across said light sensitive medium.

2. The method of claim 1 wherein said step of generating comprises the steps of:
    generating said multiplicity of selected data lines as said multiplicity of light beams sweep across said light sensitive medium in said forward direction; and
    generating said multiplicity of selected data lines as said multiplicity of light beams sweep across said light sensitive medium in said reverse direction, each light beam of said multiplicity of light beams providing a different one of said multiplicity of selected data lines in said reverse direction than it provided in said forward direction.

3. The method of claim 2 wherein said multiplicity or number "N" of modulated and parallel light beams are equally spaced a distance "S" and said relative orthogonal movement between said light sensitive medium and said sweeping light beam during one complete back and forth cycle is equal to a distance (S) times (N).

4. The method of claim 1 wherein said two light beams are spaced apart by the distance "S" and said relative orthogonal movement between said light sensitive medium and said two sweeping light beams is equal to (2)(S).

5. The method of claim 1 wherein said multiplicity of light beams comprise a first light beam, a second light beam, a third light beam and a fourth light beam, and wherein said generating step comprises the steps of:
    generating first, second, third and fourth selected data lines with said first, second, third and fourth light beams respectively as said light beams sweep across said light sensitive medium in said forward direction; and
    generating said first, second, third and fourth selected data lines with said third, fourth first and second light beams respectively as said light beams sweep across said light sensitive medium in said reverse direction.

6. The method of claim 5 wherein said four light beams are equally spaced apart by a distance "S" and said relative orthogonal movement between said light sensitive medium and said four sweeping light beams is equal to (4)(S).

7. The method of claim 1 wherein said step of providing relative motion comprises the step of moving said light sensitive medium in a direction orthogonal to said multiplicity of sweeping light beams.

8. The method of claim 1 wherein said light sensitive medium is a light sensitive drum rotating around an axis.

9. The method of claim 1 wherein said step of providing relative motion comprises the steps of mounting said oscillating reflective surface on a second pivot axis orthogonal to said first pivot axis and pivoting said oscillating reflective surface around said second pivot axis.

10. The method of claim 1 wherein said step of providing relative motion comprises the steps of intercepting said multiplicity of modulated and parallel light beams at another reflective surface having a pivot axis for moving said multiplicity of light beams orthogonal to said sweeping light beams.

11. Apparatus for generating lines of data on a light sensitive medium comprising:
    a multiplicity of equally spaced apart parallel light beams;
    a surface for receiving and reflecting said multiplicity of spaced parallel light beams, said reflective surface pivotally mounted about a selected axis such that said reflective multiplicity of parallel light beams sweep back and forth;
    the light sensitive medium located to intercept said parallel light beams as said light beams sweep across said medium in a forward direction and a reverse direction; and control circuitry for selectively modulating each of said multiplicity of spaced light beams as they sweep across said light sensitive medium to generate said lines of data, wherein said multiplicity of parallel light beams comprise two spaced parallel light beams sweeping across said light sensitive medium and wherein said control circuit modulates a first one of said two light beams to generate a first line of data and a second one of said two light beams to generate a second line of data as said light beams sweep in said forward direction; and said control circuitry modulates said first light beam to generate said second line of data and said second light beam to generate said first line of data as said light beams sweep in said reverse direction.

12. The apparatus of claim 11 wherein said multiplicity of parallel light beams comprise four equally spaced parallel light beams sweeping across said light sensitive medium and wherein said control circuit modulates a first one, a second one, a third one and a fourth one of said four parallel light beams to generate a first line of data, a second line of data and a third line of data and a fourth line of data respectively on said light sensitive medium as said four parallel light beams move in said forward direction and said control circuitry modulating said first, second, third and fourth light beams to generate said third, fourth, first and second lines of data on said light sensitive medium as said four parallel light beams move in said reverse direction.

13. The apparatus of claim 11 wherein said light sensitive medium is adapted for moving at a selected speed orthogonal to said equally spaced sweeping parallel and modulated light beams.

14. The apparatus of claim 13 wherein said light sensitive medium is a rotating light sensitive drum.

15. The apparatus of claim 11 wherein said surface for receiving and reflecting in pivotally mounted to rotate about a second pivot axis orthogonal to said first pivot axis to move said multiplicity of light beams in a direction orthogonal to said sweep across said light sensitive medium.

16. The apparatus of claim 11 further comprising a second reflecting surface pivotally mounted for moving said multiplicity of parallel light beams orthogonal to said sweeping movement.

17. A method of printing lines of data on a light sensitive medium comprising the steps of:
providing a light sensitive medium;
oscillating a reflective surface about a first pivot axis;
directing a multiplicity of modulated and parallel light beams onto said oscillating reflective surface;
reflecting said multiplicity of modulated and parallel light beams from said oscillating reflective surface to sweep said light beams back and forth across said light sensitive medium in a forward and a reverse direction;
moving said light sensitive medium in an orthogonal direction with respect to said forward and reverse directions of said sweeping light beams; and
generating a multiplicity of selected data lines on said moving light sensitive medium as said multiplicity of modulated and parallel light beams sweep across said light sensitive medium, wherein said multiplicity of light beams comprise a first light beam, a second light beam, a third light beam and a fourth light beam, and wherein said generating step comprises the steps of:
generating first, second, third and fourth selected data lines with said first, second, third and fourth light beams respectively as said light beams sweep across said light sensitive medium in said forward direction; and
generating said first, second, third and fourth selected data lines with said third, fourth first and second light beams respectively as said light beams sweep across said light sensitive medium in said reverse direction.

18. The method of claim 17 wherein said step of generating comprises the steps of:
generating said multiplicity of selected data lines as said multiplicity of light beams sweep across said moving light sensitive medium in said forward direction; and
generating said multiplicity of selected data lines as said multiplicity of light beams sweep across said moving light sensitive medium in said reverse direction, each light beam of said multiplicity of light beams providing a different one of said multiplicity of selected data lines in said reverse direction than it provided in said forward direction.

19. The method of claim 18 wherein said multiplicity or number "N" of modulated and parallel light beams are equally spaced a distance "S" and said orthogonal movement of said moving light sensitive medium during one complete back and forth cycle is equal to a distance (S) times (N).

20. A method of generating lines of data on a light sensitive display comprising the steps of:
providing a light sensitive display medium;
oscillating a reflective surface about a first pivot axis;
directing a multiplicity of modulated and parallel light beams onto said oscillating reflective surface;
reflecting said multiplicity of modulated and parallel light beams from said oscillating reflective surface to sweep said light beams back and forth across said light sensitive display medium in a forward and a reverse direction;
moving said sweeping light beams in an orthogonal direction with respect to said forward and reverse directions of said sweeping light beams; and
generating a multiplicity of selected data lines on said light sensitive display as said multiplicity of modulated and parallel light beams sweep across said light sensitive display medium, wherein said multiplicity of light beams comprise a first light beam, a second light beam, a third light beam and a fourth light beam, and wherein said generating step comprises the steps of:
generating first, second, third and fourth selected data lines with said first, second, third and fourth light beams respectively as said light beams sweep across said light sensitive display medium in said forward direction; and
generating said first, second, third and fourth selected data lines with said third, fourth first and second light beams respectively as said light beams sweep across said light sensitive display medium in said reverse direction.

21. The method of claim 20 wherein said step of generating comprises the steps of:
generating said multiplicity of selected data lines as said multiplicity of light beams sweep across said light sensitive medium in said forward direction; and
generating said multiplicity of selected data lines as said multiplicity of light beams sweep across said light sensitive medium in said reverse direction, each light beam of said multiplicity of light beams providing a different one of said multiplicity of selected data lines in said reverse direction than it provided in said forward direction.

22. The method of claim 21 wherein said multiplicity or number "N" of modulated and parallel light beams are equally spaced a distance "S" and said orthogonal movement of said sweeping light beam during one complete back and forth cycle is equal to a distance (S) times (N).

23. Apparatus for printing lines of data on a light sensitive medium comprising:
- a multiplicity of equally spaced apart parallel light beams;
- a surface for receiving and reflecting said multiplicity of spaced parallel light beams, said reflective surface pivotally mounted about a selected axis such that said reflective multiplicity of parallel light beams sweep back and forth;
- a light sensitive rotating drum located to intercept said parallel light beams as said light beams sweep across said rotating drum in a forward direction and a reverse direction, said light sensitive rotating drum rotating in a direction orthogonal to said sweeping light beams; and
- control circuitry for selectively modulating each of said multiplicity of spaced light beams as they sweep across said light sensitive rotating drum to generate said lines of data, wherein said multiplicity of parallel light beams comprise four equally spaced parallel light beams sweeping across said light sensitive rotating drum and wherein said control circuit modulates a first one, a second one, a third one and a fourth one of said four parallel light beams to generate a first line of data, a second line of data and a third line of data and a fourth line of data respectively on said light sensitive rotating drum as said four parallel light beams move in said forward direction and said control circuitry modulating said first, second, third and fourth light beams to generate said third, fourth, first and second lines of data respectively, on said light sensitive rotating drum as said four parallel light beams move in said reverse direction.

24. Apparatus for generating lines of data on a light sensitive display medium comprising:
- a multiplicity of equally spaced apart parallel light beams;
- a surface for receiving and reflecting said multiplicity of spaced parallel light beams, said reflective surface pivotally mounted about a first selected axis such that said reflective multiplicity of parallel light beams sweep back and forth and said surface also pivotally mounted to provide motion about a second axis perpendicular to said first selected axis, said motion about said second axis being orthogonal to motion about said first selected axis;
- a light sensitive display medium located to intercept said parallel light beams as said light beams sweep across said display medium in a forward direction and a reverse direction; and
- control circuitry for selectively modulating each of said multiplicity of spaced light beams as they sweep across said light sensitive display medium to generate said lines of data, wherein said multiplicity of parallel light beams comprise four equally spaced parallel light beams sweeping across said light sensitive display and wherein said control circuit modulates a first one, a second one, a third one and a fourth one of said four parallel light beams to generate a first line of data, a second line of data and a third line of data and a fourth line of data respectively on said light sensitive display medium as said four parallel light beams move in said forward direction and said control circuitry modulating said first, second, third and fourth light beams to generate said third, fourth, first and second lines of data respectively, on said light sensitive display medium as said four parallel light beams move in said reverse direction.

* * * * *